(12) United States Patent
Watanabe

(10) Patent No.: US 7,633,716 B2
(45) Date of Patent: Dec. 15, 2009

(54) MAGNETIC HEAD WITH A SLIDER AND A GIMBAL SUSPENSION HAVING A FLEXURE INCLUDING SPACER PROJECTIONS FOR BONDING THE SLIDER

(75) Inventor: Mitsuru Watanabe, Niigata-ken (JP)

(73) Assignee: TDK Corporation, Tokyo (JP)

( * ) Notice: Subject to any disclaimer, the term of this patent is extended or adjusted under 35 U.S.C. 154(b) by 355 days.

(21) Appl. No.: 11/352,740

(22) Filed: Feb. 13, 2006

(65) Prior Publication Data
US 2006/0187584 A1 Aug. 24, 2006

(30) Foreign Application Priority Data
Feb. 23, 2005 (JP) ............... 2005-047579

(51) Int. Cl.
G11B 5/60 (2006.01)
(52) U.S. Cl. .................. 360/234.6; 360/245.3
(58) Field of Classification Search .............. 360/234.6, 360/245.3
See application file for complete search history.

(56) References Cited

U.S. PATENT DOCUMENTS

| | | | | |
|---|---|---|---|---|
| 5,696,651 | A * | 12/1997 | Endo et al. .............. | 360/245.8 |
| 5,774,305 | A * | 6/1998 | Boutaghou .............. | 360/245.4 |
| 5,880,908 | A | 3/1999 | Shiraishi et al. | |
| 6,078,472 | A * | 6/2000 | Mitoh et al. ............. | 360/245.4 |
| 6,940,694 | B2 * | 9/2005 | Ohwe et al. ............. | 360/234.6 |
| 7,002,780 | B2 * | 2/2006 | Rancour et al. .......... | 360/234.6 |
| 7,006,331 | B1 * | 2/2006 | Subrahmanyam et al. ....................... | 360/245.9 |
| 7,095,590 | B2 | 8/2006 | Motonishi et al. | |
| 2004/0075946 | A1 | 4/2004 | Motonishi et al. | |
| 2006/0203389 | A1 * | 9/2006 | Motonishi ................ | 360/234.6 |

FOREIGN PATENT DOCUMENTS

| | | |
|---|---|---|
| CN | 1497536 | 5/2004 |
| JP | 5314700 | 11/1993 |
| JP | 7-153049 | 6/1995 |
| JP | 9-282824 | 10/1997 |
| JP | 10-27447 | 1/1998 |
| JP | 10-69745 | 3/1998 |
| JP | 10-162535 | 6/1998 |
| JP | 10162333 | 6/1998 |
| JP | 11-39627 | 2/1999 |

OTHER PUBLICATIONS

First Office Action for corresponding Chinese Patent Application Serial No. 2006100088766, dated Jun. 22, 2007.
Office Action issued in corresponding Japanese Patent Application No. P2005-047579; issued Mar. 11, 2008.
Notice of Allowance issued in corresponding Japanese Patent Application No. 2005-047579; mailed Jun. 17, 2008.

* cited by examiner

*Primary Examiner*—Jefferson Evans
(74) *Attorney, Agent, or Firm*—Brinks Hofer Gilson & Lione

(57) ABSTRACT

A magnetic head is provided that is formed by fixedly bonding a slider having a thin-film magnetic element on a flexure formed of metallic material which constitutes a gimbal suspension. The slider includes electrodes conducted to the thin-film magnetic head on an end surface thereof on a trailing side which is orthogonal to the recording-medium-opposed surface. The flexure has independent spacer projections. The slider and the flexure are bonded by an adhesive agent applied to bonding areas on end surfaces of a pair of spacer projections positioned in the vicinity of the end surface of the slider on the trailing side of the spacer projections.

4 Claims, 6 Drawing Sheets

MAGNETIC HEAD WITH A SLIDER AND A GIMBAL SUSPENSION HAVING A FLEXURE INCLUDING SPACER PROJECTIONS FOR BONDING THE SLIDER

BACKGROUND OF THE INVENTION

1. Field of the Invention

The present invention relates to a magnetic head and, more specifically, to a magnetic head having a bonding structure between a slider and a flexure of a head gimbal assembly for supporting the slider.

2. Description of the Related Art

An HGA (head gimbal assembly) which is widely used in HDD is formed by fixedly bonding a slider having a thin-film magnetic head element (MR element, GMR element) on one end portion of a flexure formed of metallic material which is fixed to a distal end of a load beam. In the related art, a spacer projection is fixed to a surface of the flexure, and the slider is bonded in an area surrounded by the spacer projection where adhesive agent is applied (Japanese Unexamined Patent Application Publication No. 9-282824 (U.S. Pat. No. 5,880,908), Japanese Unexamined Patent Application Publication No. 10-27447, and Japanese Unexamined Patent Application Publication No. 11-39627).

FIG. 9 is a plan view of a distal end portion of the flexure in the related art, and FIG. 10 is a side view showing a state in which the slider is bonded to the flexure. On a flexure 121, there are provided a plurality of spacer projections 122a, 122b, 122c that support a slider 111 of a magnetic head, and electrodes 133a to 133d formed on an FPC substrate which is connected to electrodes 114d (although there are a plurality of electrodes, only one of those is shown in FIG. 10) provided on an end surface B of the slider 111 on a trailing side by ball bonding. A back surface of the slider 111 on the opposite side from a recording-medium-opposed surface (ABS surface) 112, which is a surface opposing to a magnetic recording medium, is bonded to surfaces of the spacer projections 122a to 122c by an adhesive agent 124 applied thereon. After this bonding operation, the electrodes 114d provided on the end surface B of the slider 111 on the trailing side is joined to the electrodes 133a to 133d formed on the flexure 121 via a ball bonding portion 125 formed by ball bonding using gold or the like.

However, in the related art, a length of the bonding portion between the ball bonding portion 125 of the end surface B of the slider 111 on the trailing side and the spacer projection 122b in the vicinity of an end surface A on a leading side is long. Therefore, the ball bonding portion 125 which is a rigid joint becomes a point of support a' of deformation, and the bonded portion with respect to the adhesive agent becomes a load center b', so that flatness of the ABS of the slider 111 is susceptible to deformation disadvantageously due to expansion of the flexure 121 by heat applied during bonding and contraction of the flexure 121 by a subsequent cooling operation. There is also a problem such that the flatness of the recording-medium-opposed surface of the slider is significantly changed due to expansion or contraction of the flexure due to change in temperature of operating environment in a state of being assembled in a hard disk device. In this manner, when the flatness of the recording-medium-opposed surface is changed, the raising amount is increased and hence writing/reading performance is lowered. Therefore, it is desirable that the variation of the flatness of the recording-medium-opposed surface of the slider is small.

SUMMARY OF THE INVENTION

In view of the problems of the magnetic head in the related art as described above, it is an object of the invention to provide a magnetic head in which a variation in flatness of a recording-medium-opposed surface of a slider is small even when it is subjected to change in temperature.

In order to achieve the object described above, the invention provides a magnetic head including a slider having a thin-film magnetic element fixedly bonded to a flexure formed of metallic material constituting a gimbal suspension, wherein the slider includes a plurality of electrodes that are conducted to the thin-film magnetic element on an end surface thereof on a trailing side orthogonal to a recording-medium-opposed surface, and a portion of the slider closer to the end surface on the trailing side with respect to a center of the plane thereof is bonded to the flexure.

In an embodiment, a bonding position between the slider and the flexure is deviated to an area closer to the end surface on the trailing side having the electrodes with respect to the center of the plane of the slider.

In another embodiment, a plurality of independent spacer projections are provided on the flexure, and the slider is bonded to the spacer projections located near the end surface on the trailing side out of the spacer projections with an adhesive agent applied to surfaces thereof.

More practically, the spacer projections include pair of two spacer projections extending in parallel to each other in the direction orthogonal to the end surface on the trailing side, and a spacer projection provided non-continuously from the pair of two spacer projections at a position apart from the end surface on the trailing side and extending in the direction orthogonal to the direction of extensions of the pair of two spacer projections, and the adhesive agent is applied only on portions of the pair of two spacer projections closer to the end surfaces on the trailing side.

A contact surface area of the adhesive agent is reduced from the portion closer to the end surfaces of the spacer projections on the trailing side toward an end surfaces on a leading side. In this structure, deformation of the slider in association with change in temperature at the time of curing the adhesive agent can be reduced, and the bonding surface area can be secured to improve the bonding strength.

Preferably, fillets are formed between opposing side surfaces of the slider in the vicinity of the end surface on the trailing side and the surface opposing to the flexure, and the slider and the flexure are bonded by an adhesive agent filled between the respective fillets and the flexures. With these fillets, the bonding surface area is secured, and deformation of the slider can be reduced, and also the bonding strength can be secured.

Since the distance between the ball bonding portion on the end surface of the slider on the trailing side and the bonding portion is short, even when the flexure and the slider are expanded and contracted at different coefficients of thermal expansion due to change in temperature, the influence of the difference of expansion and contraction is small and hence the amount of deformation of the recording-medium-opposed surface of the slider is small.

DESCRIPTION OF THE PREFERRED EMBODIMENTS

Figure 1:
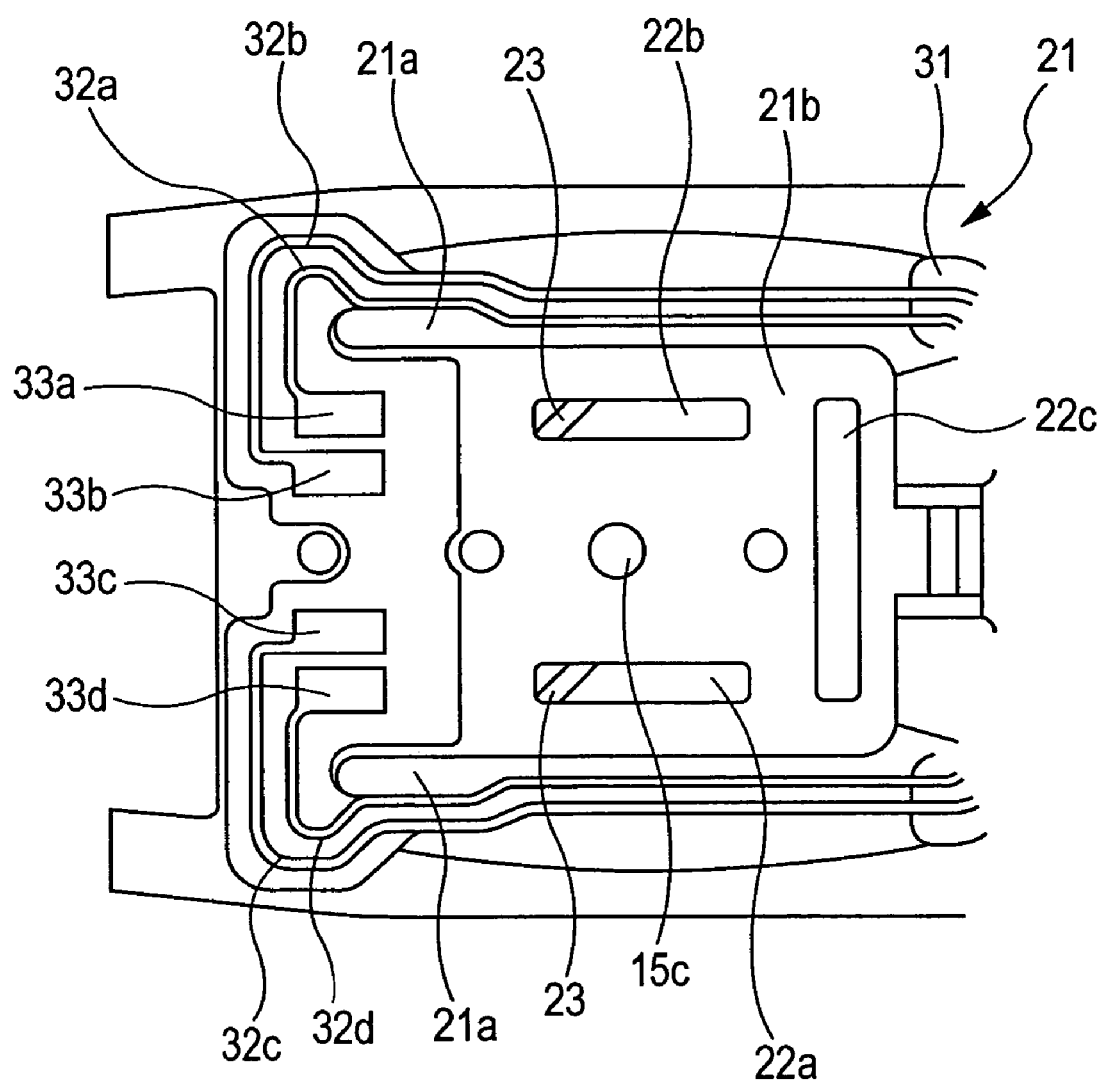
FIG. 1 a plan view showing a distal end portion of a flexure according to an embodiment to which the invention is applied.
Figure 2:
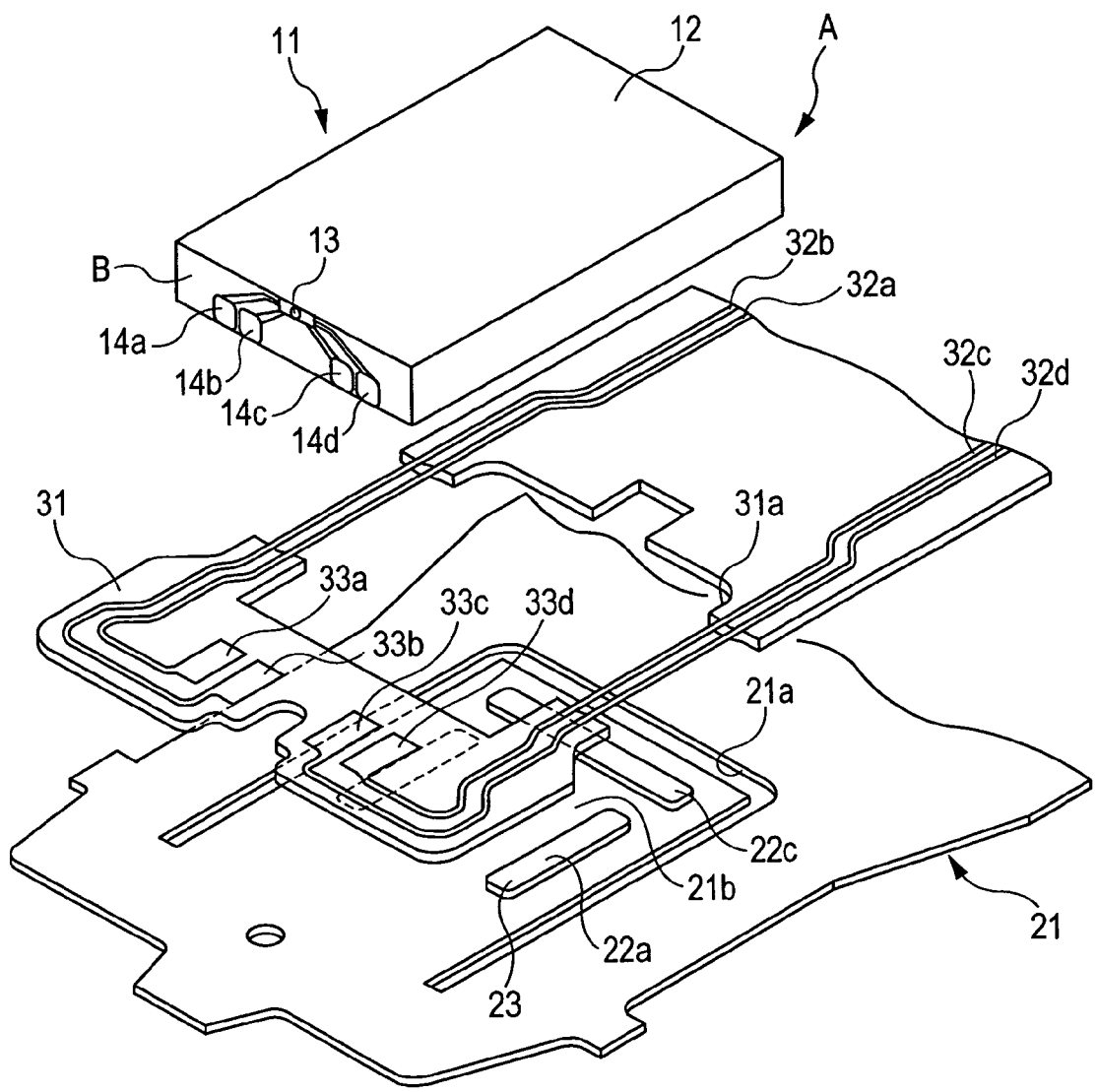
FIG. 2 is an explosive perspective view showing an example of a bonding structure between the flexure and a slider in the same embodiment.

FIG. 1 is a plan view of a distal end portion of a flexure 21 which constitutes a head gimbal assembly according to an embodiment to which the invention is applied; FIG. 2 is an exploded perspective view of a flexure portion. The flexure 21 is formed of stainless steel welded by a laser beam to a distal end portion of a load beam which is rotatably supported on a revolving shaft, not shown.

A slider bonding tongue 21b which is resiliently deformable by a U-shaped through groove 21a is formed at a distal end portion of the flexure 21. An FPC substrate 31 is provided on the flexure 21 so as to surround the U-shaped through groove 21a. In FIG. 2, although the FPC substrate 31 is shown as a separate member from the flexure 21 for the sake of convenience, the FPC substrate 31 is actually formed by laminating a resin base and a lead on the flexure 21. The slider bonding tongue 21b is exposed from a hole 31a on the FPC substrate 31.

The FPC substrate 31 is formed with lead patterns 32a, 32b and lead patterns 32c, 32d along an edge of the hole 31a, that is, along outer portions on both side edges of the slider bonding tongue 21b, and bonding pads 33a to 33d are formed on distal end portions of the lead patterns 32a to 32d. Although the lead patterns 32a to 32d and the bonding pads 33a to 33d are shown as separate members from the flexure 21 in FIG. 2, they are actually formed by laminating a resin base and a lead on the flexure 21.

Provided on the slider bonding tongue 21b are a pair of spacer projections 22a, 22b extending in parallel to each other in a direction orthogonal to an end surface B on a trailing side, and a spacer projection 22c provided non-continuously from the pair of spacer projections 22a, 22b at a position apart from the end surface B on the trailing side and extending in a direction orthogonal to the direction of extensions of the pair of two spacer projections 22a, 22b for fixedly adhering a slider 11. The spacer projections 22a to 22c are formed of, for example, polyimide resin so as to have flat surfaces and are bonded to the slider bonding tongue 21b. Surfaces of the bonding pads 33a to 33d and surfaces of the spacer projections 22a to 22c are formed so as to position at the same level (on the same surface). In FIG. 1, reference numeral 15c designates the position of a plane center with which a plane center on a back surface of the slider 11 is overlapped when the slider 11 is fixedly bonded.

The slider 11 is formed of ceramic material such as alumina-titan carbide or Si (Silicon), and is formed with an air-group and an ABS surface, not shown, on a recording-medium-opposed surface 12 opposing to a recording medium. A surface of the slider 11 on the opposite side from the recording-medium-opposed surface 12 corresponds to a bonding surface 15.

A thin-film magnetic element 13 and four electrodes 14a to 14d connected to the thin-film magnetic element 13 are provided on the end surface B (end portion) of the slider 11 on the trailing side. The thin-film magnetic element 13 is formed by laminating permalloy as magnetic material (Ni—Fe alloy) and alumina as insulating material, and includes a magnetic detection unit for reproducing magnetic recording signal recorded on a magnetic disk, or a magnetic recording unit for recording the magnetic signal on the magnetic disk, or both of the magnetic detection unit and the magnetic recording unit. The magnetic detection unit is a GMR head composed, for example, of a giant magnetoresistive effect element (GMR element). The magnetic recording unit is composed of an inductive head in which a coil and a core are patterned. The magnetic recording unit and the magnetic detection unit are connected to corresponding electrodes 14a to 14d. The electrodes 14a to 14d are joined to the bonding pads 33a to 33d by ball bonding with gold balls or the like.

A bonding area 23 for bonding the slider 11 is shown in FIG. 1. In this example, ends of the pair of spacer projections 22a, 22b in the vicinity of the bonding pads 33a to 33d are set as the bonding areas 23. An adhesive agent 24 is applied to the bonding areas 23 and the bonding surface 15 of the slider 11 is pressed against the spacer projections 22a to 22c, and then bonding pads 33a to 33d and the electrodes 14a to 14d of the slider 11 are joined by ball bonding portions 25 formed by ball bonding with golden balls. Subsequently, the bonding areas 23 and the portion therearound are heated to cure the adhesive agent 24. The adhesive agent 24 is not applied to the spacer projection 22c. By pressing the slider 11 toward the spacer projections 22a to 22c, the adhesive agent 24 may be spread in the periphery of the bonding area 23 or along the surfaces of the pair of spacer projections 22a, 22b, but it may not be spread over the portion of the spacer projection 22c. In other words, according to this embodiment, the slider 11 is bonded to the bonding area 23 of the pair of spacer projections 22a, 22b which are located on the side of the slider 11 (bonding surface 15) closer to the bonding pads 33a to 33d with respect to the plane center 15c.

Figure 3:
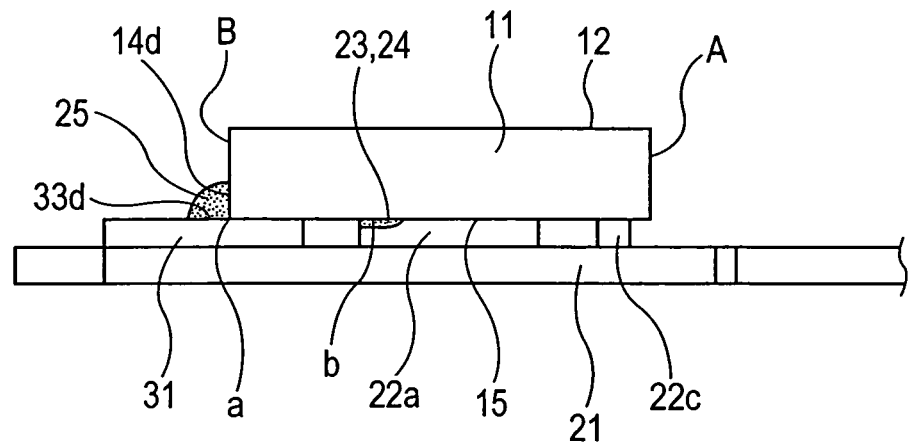
FIG. 3 is a side cross-sectional view of the distal end portion of the flexure taken along the line X-X in FIG. 4, showing an example of a bonding position of the slider on the flexure in the same embodiment.

FIG. 3 is a side view of the slider 11 fixedly bonded to the flexure 21 as described above. In the embodiment shown in the drawing, a fixed position between the slider 11 and the flexure 21, that is, the joint portion joined by rigid bonding with the ball bonding portion 25 becomes a point of support a, and a bonding portion bonded to the bonding area 23 of the pair of spacer projection 22a (22b) with the adhesive agent 24 becomes a load center b. The distance between the point of support a and the load center b is relatively small. Therefore, even when the temperatures of the flexure 21 and the slider 11 are changed, and the flexure 21 is expanded or contracted, a force applied to the slider 11 is weak and hence deformation of the slider 11 is small.

Figure 4:
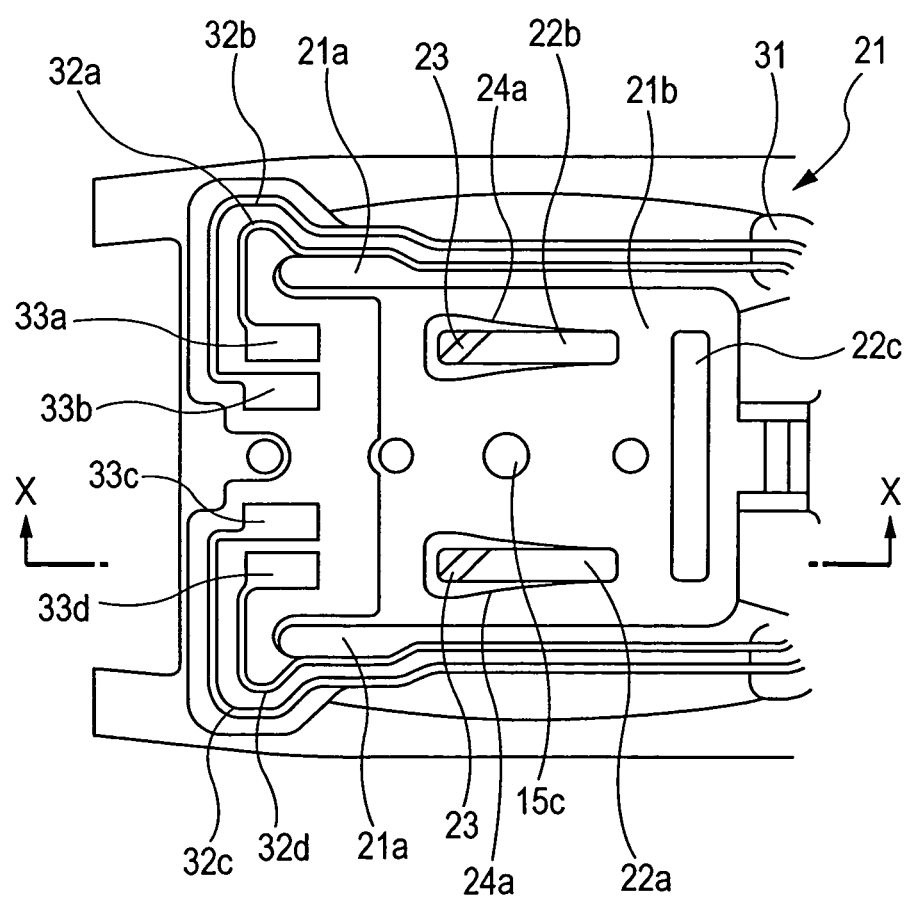
FIG. 4 is a plan view showing a state in which a bonding surface area on the slider is reduced from a trailing side toward a leading side in the same embodiment.

The adhesive agent 24 is applied to the respective bonding areas 23 of the pair of spacer projections 22a, 22b and the slider 11 is clamped between the pair of spacer projections 22a, 22b with a pressure. Then, the adhesive agent 24a may be protruded from the pair of spacer projections 22a, 22b, and spread in a gap between the bonding surface 15 of the slider 11 and the pair of spacer projections 22a, 22b toward an end surface A on a leading side. In this example, the bonding surface area and the thickness of the bonded portion between the bonding surface 15 of the slider 11 and the pair of spacers 22a, 22b is increased in the bonding areas 23 closer to the end surface B on the trailing side and the area thereof around and decreased toward the end surface A on the leading side (see FIG. 4). Therefore, deformation of the slider 11 in association with the change in temperature when curing the adhesive agent 24 can be reduced, and the bonding surface area can be secured to improve the bonding strength.

Figure 5:
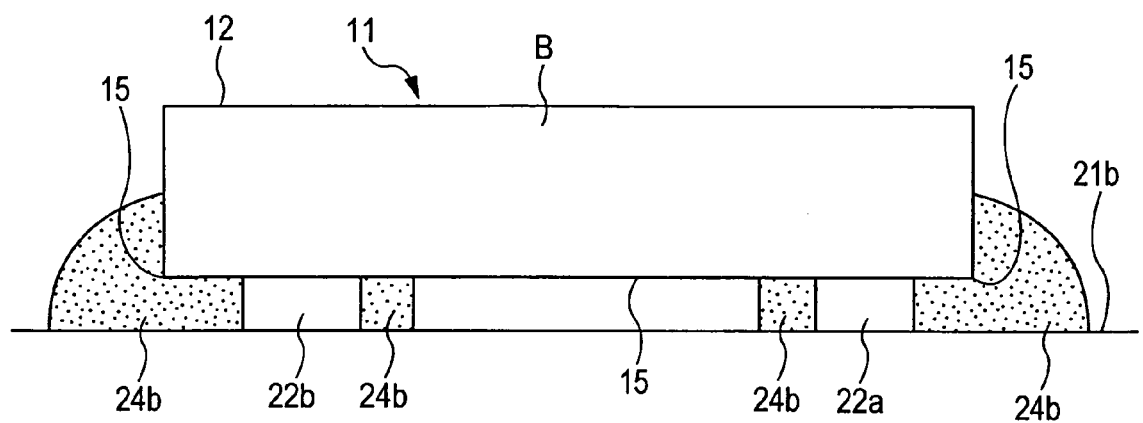
FIG. 5 is a front view of an example in which fillets are formed between both side surfaces of the slider in a vicinity of an end surface on the trailing side and a surface opposing to the flexure on the opposite side from a recording-medium-opposed surface in the same embodiment.
Figure 6:
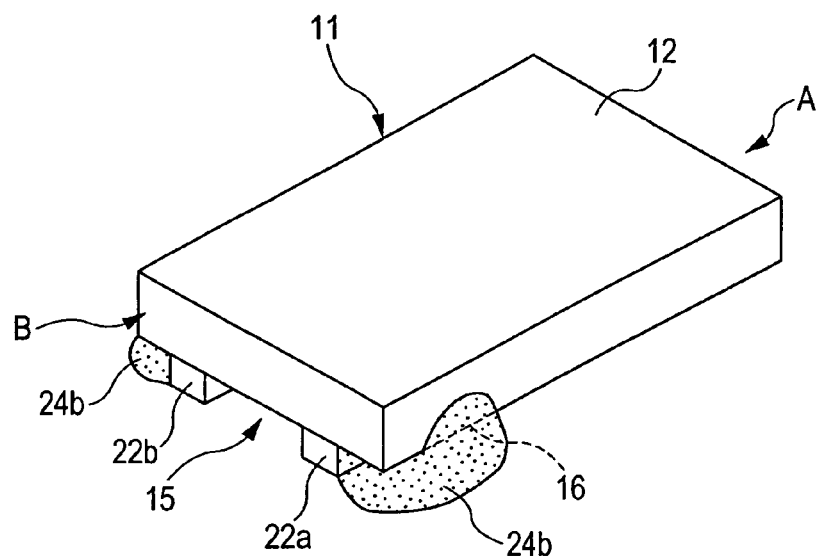
FIG. 6 is a perspective view of the same example.

FIG. 5 and FIG. 6 show a front view and a perspective view of another embodiment of the invention, respectively. In this embodiment, fillets 16 are formed between both side surfaces in the vicinity of the end surface B of the slider 11 on the trailing side and the adhesive surface 15. Then, the adhesive agent 24b is filled between the respective fillets 16 and the flexure 21 (slider bonding tongue 21b). By forming the fillets 16 in this manner, the bonding surface area between the portion in the vicinity of the end surface B of the slider 11 on the trailing side and the adhesive agent 24b is increased, and hence deformation of the slider 11 can be reduced and the bonding strength can be secured. The fillets 16 may be any form that allows the adhesive agent 24b to spread easily to increase the bonding surface area.

Figure 7:
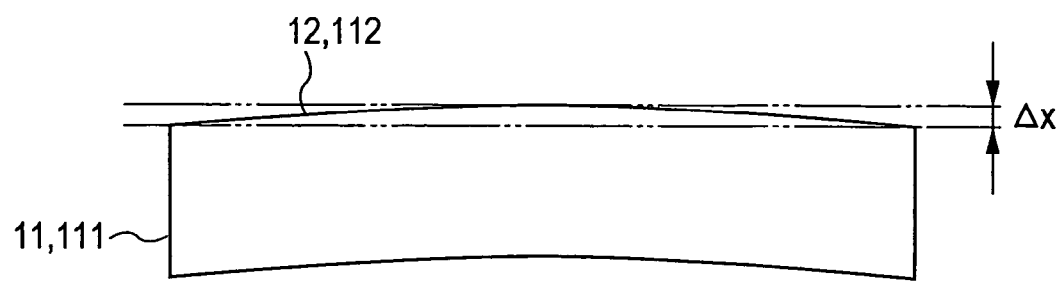
FIG. 7 is a drawing showing a state in which the recording-medium-opposed surface of the slider is deformed according to expansion and contraction of the flexure due to change in temperature by heating at the time of curing of adhesive agent when the slider is bonded to the flexure and, subsequent cooling operation thereof, and variation in temperature depending on an operating environment.
Figure 8:
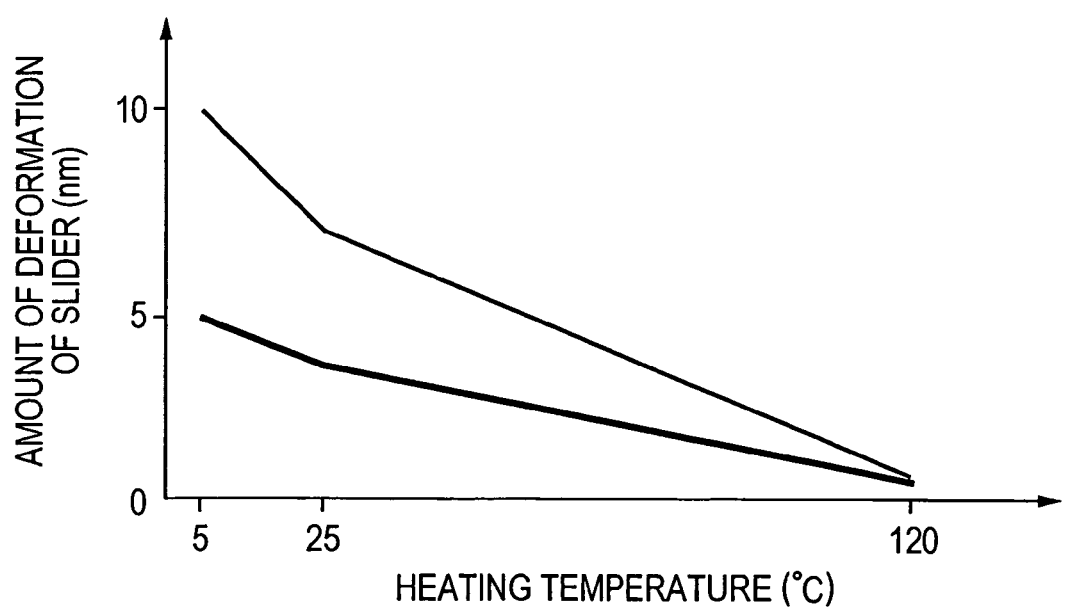
FIG. 8 is a graph showing a relation between the amount of deformation of the slider and change in temperature.
Figure 9:
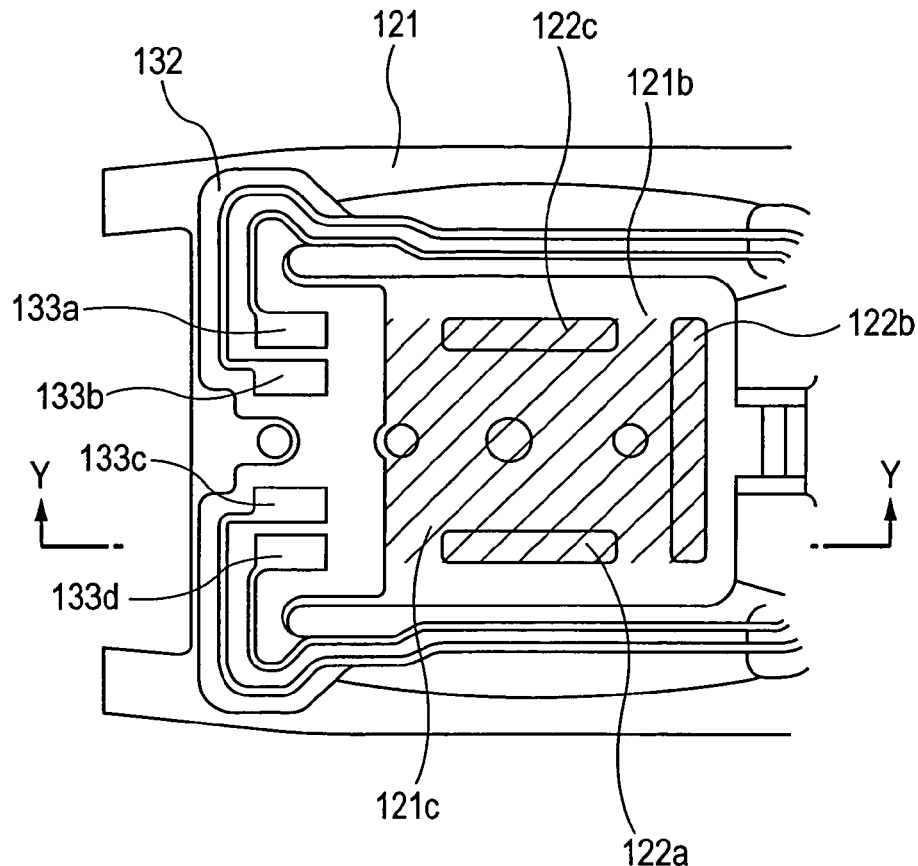
FIG. 9 is a plan view showing a structure of a distal end portion of the flexure and a position where adhesive agent is applied in the related art.
Figure 10:
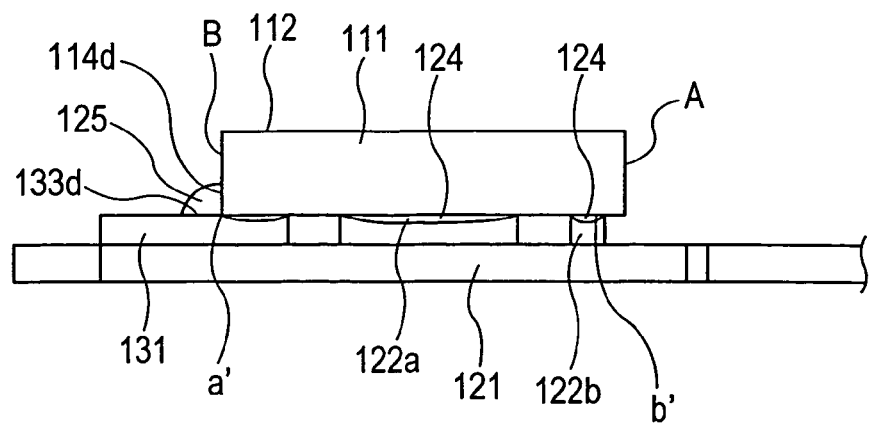
FIG. 10 is a side cross-sectional view taken along the line Y-Y in FIG. 9, showing a bonding structure between the flexure and the slider in the related art.

FIG. 7 shows a state in which the slider 11 (111) is deformed. In this drawing, a case in which the coefficient of heat expansion of the flexure is larger than that of the slider 11 (111), and the slider 11 (111) is sagged in the direction in which the recording-medium-opposed surface 12 (112) is protruded, and the amount of deformation $\Delta x$. FIG. 8 is a graph showing a relation between the amount of deformation $\Delta x$ and the temperature. In this graph, a lateral axis represents the temperature (° C.), a vertical axis represents the amount of deformation $\Delta x$ (nm). In the graph, a solid line indicates the case of the embodiment of the invention (slider 11), and a broken line indicates the case of the related art (slider 111). It will be understood from this graph that the embodiment of the invention is smaller in the amount of deformation $\Delta x$ due to the change in temperature.

Although the pair of spacer projections 22a, 22b extending in parallel and the spacer projection 22c extending orthogonally thereto are arranged in the embodiment shown in the drawing, the number of spacer projections and the arrangement thereof are not limited thereto. The spacer projections to be bonded may be of any number and arrangement as long as they are arranged so as to deviate on the side of the end surface B of the slider 11 on the trailing side with respect to the plane center position 11c and do not extend to the area of the end surface A on the leading side with respect to the plane center position 11c, or are separated from the spacer projection in the area of the end surface A on the leading side.

What is claimed is:

1. A magnetic head comprising a slider having a thin-film magnetic element fixedly bonded to a flexure formed of metallic material constituting a gimbal suspension, wherein
the slider comprises a plurality of electrodes that are conducted to the thin-film magnetic element on an end surface thereof on a trailing side orthogonal to a recording-medium-opposed surface,
only a portion of the slider closer to the end surface on the trailing side with respect to a center of the plane thereof is bonded to the flexure; and
wherein a plurality of independent spacer projections are provided on the flexure, and the slider is bonded to the spacer projections located near the end surface of the slider on the trailing side of the spacer projections with an adhesive agent applied to surfaces thereof.

2. The magnetic head according to claim 1, wherein a bonding position between the slider and the flexure is deviated to an area closer to the end surface on the trailing side having the electrodes with respect to the center of the plane of the slider.

3. The magnetic head according to claim 1, wherein the spacer projections include pair of two spacer projections extending in parallel to each other in a direction orthogonal to the end surface on the trailing side, and a spacer projection provided non-continuously from the pair of two spacer projections at a position apart from the end surface on the trailing side and extending in a direction orthogonal to the direction of extensions of the pair of two spacer projections, and the adhesive agent is applied only on portions of the pair of two spacer projections closer to the end surfaces on the trailing side.

4. The magnetic head according to claim 1, wherein a contact surface area of the adhesive agent is reduced from the portion closer to the end surfaces of the spacer projections on the trailing side toward an end surfaces on a leading side.

* * * * *